US009630672B2

(12) United States Patent
Inoue et al.

(10) Patent No.: US 9,630,672 B2
(45) Date of Patent: Apr. 25, 2017

(54) ROLL ANGLE ESTIMATION DEVICE AND TRANSPORT EQUIPMENT

(75) Inventors: Hiroyuki Inoue, Shizuoka (JP); Takahiro Fujii, Shizuoka (JP); Yoshimichi Seki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 310 days.

(21) Appl. No.: 13/518,060

(22) PCT Filed: Nov. 10, 2010

(86) PCT No.: PCT/JP2010/006588
§ 371 (c)(1),
(2), (4) Date: Jun. 21, 2012

(87) PCT Pub. No.: WO2011/077626
PCT Pub. Date: Jun. 30, 2011

(65) Prior Publication Data
US 2012/0259526 A1    Oct. 11, 2012

(30) Foreign Application Priority Data

Dec. 21, 2009    (JP) ................................. 2009-288836

(51) Int. Cl.
*G06F 19/00*    (2011.01)
*B62J 27/00*    (2006.01)
(Continued)

(52) U.S. Cl.
CPC ............ *B62J 27/00* (2013.01); *B60W 40/112* (2013.01); *B60W 2050/0056* (2013.01);
(Continued)

(58) Field of Classification Search
CPC ........... B60W 40/112; B60W 2520/18; B60W 2300/36; B60W 2520/105;
(Continued)

(56) References Cited

U.S. PATENT DOCUMENTS 7,027,903 B2 *  4/2006  Meyers et al. .................. 701/38
7,158,866 B2 *  1/2007  Gustafsson et al. ............. 701/1
(Continued)

FOREIGN PATENT DOCUMENTS

DE    103 50 047 A1    5/2005
JP       9-5104 A        1/1997
(Continued)

OTHER PUBLICATIONS

Walter Stockwell, Measure a Vehicle's Dynamic Motion, Feb. 15, 1999, printed May 12, 2015.*
(Continued)

*Primary Examiner* — Redhwan K Mawari
*Assistant Examiner* — Alan D Hutchinson
(74) *Attorney, Agent, or Firm* — Keating and Bennett, LLP

(57) ABSTRACT

A Kalman filter in a roll angle estimation device estimates a roll angle of a vehicle body, a vehicle speed, a roll angular velocity sensor offset, a yaw angular velocity sensor offset, and a vertical acceleration sensor offset on the basis of detected values of a roll angular velocity sensor, a yaw angular velocity sensor, a vertical acceleration sensor, a longitudinal acceleration sensor, a lateral acceleration sensor, and a rear-wheel speed sensor, and also on the basis of estimated values of the roll angle, the vehicle speed, the roll angular velocity sensor offset, the yaw angular velocity sensor offset, and the vertical acceleration sensor offset obtained in a previous estimation operation.

9 Claims, 11 Drawing Sheets

(51) Int. Cl.
*B60W 40/112* (2012.01)
*B60W 50/00* (2006.01)

(52) U.S. Cl.
CPC ..... *B60W 2300/36* (2013.01); *B60W 2520/00* (2013.01); *B60W 2520/105* (2013.01); *B60W 2520/125* (2013.01); *B60W 2520/14* (2013.01); *B60W 2520/16* (2013.01); *B60W 2520/18* (2013.01); *B60Y 2200/12* (2013.01); *B62K 2207/02* (2013.01)

(58) Field of Classification Search
CPC ....... B60W 2520/125; B60W 2520/16; B60W 2520/00; B60W 2520/14; B60W 2050/0056; B62J 27/00; B60Y 2200/12; B62K 2207/02
See application file for complete search history.

(56) References Cited

U.S. PATENT DOCUMENTS

| | | | |
|---|---|---|---|
| 7,480,547 B2 * | 1/2009 | Brown et al. | 701/1 |
| 2005/0216146 A1 | 9/2005 | Bauer et al. | |
| 2007/0213904 A1 | 9/2007 | Watanabe et al. | |
| 2009/0103319 A1 | 4/2009 | Peeters et al. | |
| 2009/0326858 A1 | 12/2009 | Ueda et al. | |
| 2010/0198448 A1 | 8/2010 | Ono et al. | |

FOREIGN PATENT DOCUMENTS

| | | |
|---|---|---|
| JP | 9-318382 A | 12/1997 |
| JP | 2003-14460 A | 1/2003 |
| JP | 2004-155404 A | 6/2004 |
| JP | 2004-163443 A | 6/2004 |
| JP | 2005-271914 A | 10/2005 |
| JP | 2007-271605 A | 10/2007 |
| JP | 2008-94375 A | 4/2008 |
| JP | 2008-523403 A | 7/2008 |
| JP | 2009-67300 A | 4/2009 |
| JP | 2009-73466 A | 4/2009 |
| JP | 2009-530177 A | 8/2009 |
| JP | 2011-11582 A | 1/2011 |
| WO | 02/01151 A1 | 1/2002 |
| WO | 2007/148818 A1 | 12/2007 |

OTHER PUBLICATIONS

Kionix, Accelerometer Errors, May 3, 2007, printed May 13, 2015.*
Official Communication issued in International Patent Application No. PCT/JP2010/006588, mailed on Feb. 22, 2011.

* cited by examiner

ROLL ANGLE ESTIMATION DEVICE AND TRANSPORT EQUIPMENT

BACKGROUND OF THE INVENTION

1. Field of the Invention

The present invention relates to a roll angle estimation device and transport equipment including the same.

2. Description of the Related Art

Conventionally, a variety of estimation devices for estimating a roll angle of a motorcycle or other vehicle have been proposed. For example, the aim of a headlight can be controlled on the basis of the roll angle estimated by an estimation device, so that the headlight can emit light in an appropriate direction irrespective of the inclination of the vehicle.

A vehicle posture estimation device described in JP 2009-73466 A estimates a roll angle and a pitch angle on the basis of detected values of longitudinal acceleration, lateral acceleration, vertical acceleration, yaw acceleration, and roll angular velocity of the vehicle motion, and also on the basis of an estimated value of longitudinal vehicle body speed and an estimated value of pitch angular velocity.

The conventional estimation device, however, cannot estimate the roll angle of a vehicle with high accuracy. This may cause, for example, the headlight aim to be askew even though the vehicle is not inclined.

SUMMARY OF THE INVENTION

Preferred embodiments of the present invention provide a roll angle estimation device that can estimate the roll angle of a movable object with high accuracy, and transport equipment including the same.

According to an aspect of a preferred embodiment of the present invention, a roll angle estimation device that estimates a roll angle of a movable object includes first and second angular velocity detectors that detect first and second angular velocities, respectively, about first and second axes extending in at least two directions, first, second, and third acceleration detectors that detect first, second, and third accelerations, respectively, in at least three directions, a speed information detector that detects information regarding a moving speed in a traveling direction of the movable object, and an estimator that estimates the roll angle of the movable object and also estimates an offset error of at least one of the first and second angular velocity detectors and the first, second, and third acceleration detectors, wherein the estimator estimates the roll angle of the movable object and the at least one offset error in a current estimation on the basis of detected values of the first and second angular velocity detectors, detected values of the first, second, and third acceleration detectors, a detected value of the speed information detector, and an estimated value of the roll angle and an estimated value of the offset error obtained in a previous estimation operation.

In this roll angle estimation device, the first and second angular velocities about the first and second axes extending in at least two directions are detected by the first and second angular velocity detectors, respectively. Further, the first, second, and third accelerations in at least three directions are detected by the first, second, and third acceleration detectors, respectively. Furthermore, the information regarding the moving speed in the traveling direction of the movable object is detected by the speed information detector. Then, the roll angle of the movable object is estimated by the estimator, and an offset error of the detected value of at least one detector among the first and second angular velocity detectors and the first, second, and third acceleration detectors is estimated by the estimator.

In this case, the estimator estimates the roll angle of the movable object and the at least one offset error in a current estimation operation on the basis of the detected values of the first and second angular velocity detectors, the detected values of the first, second, and third acceleration detectors, the detected value of the speed information detector, the estimated value of the roll angle obtained in the previous estimation operation, and the estimated value of the offset error obtained in the previous estimation operation.

As described above, the offset error is estimated as well as the roll angle, and the estimated value of the offset error is used in a next estimation operation. This compensates for the degradation in estimation accuracy of the roll angle due to the offset error of at least one of the first and second angular velocity detectors and the first, second, and third acceleration detectors. As a result, the roll angle can be estimated with high accuracy.

The first and second angular velocity detectors may respectively detect the first and second angular velocities about the first and second axes extending in directions different from each other, and the first, second, and third acceleration detectors may respectively detect the first, second, and third accelerations in first, second, and third directions different from one another. In this case, the first and second angular velocities about the first and second axes extending in different directions are detected by the first and second angular velocity detectors, respectively. Further, the first, second, and third accelerations in the first, second, and third directions different from one another are detected by the first, second, and third acceleration detectors, respectively.

The estimator may estimate an offset error of at least one of the first and second angular velocity detectors as the at least one offset error.

An angular velocity detector is susceptible to an offset error compared to an acceleration detector. Therefore, the use of the estimated value of the offset error of at least one of the first and second angular velocity detectors in the next estimation operation leads to a sufficiently improved estimation accuracy of the roll angle.

The estimator may estimate offset errors of the first and second angular velocity detectors as the at least one offset error. In this case, the use of the estimated values of the offset errors of the first and second angular velocity detectors in the next estimation operation leads to a further improvement of the estimation accuracy of the roll angle.

The estimator may further estimate an offset error of at least one of the first, second, and third acceleration detectors as the at least one offset error. In this case, the use of the estimated value of the offset error of at least one of the first, second, and third acceleration detectors, in addition to the estimated value of the offset error of at least one of the first and second angular velocity detectors, in the next estimation operation leads to a further improvement of the estimation accuracy of the roll angle.

The first acceleration may be an acceleration in an up-and-down direction of the movable object, and the estimator may estimate the offset error of the first acceleration detector.

In the range where the roll angle of the movable object is small, the acceleration in the up-and-down direction of the movable object hardly changes. If the detected value of such an acceleration in the up-and-down direction changes due to the offset error of the first acceleration detector, the change in the detected value of the acceleration in the up-and-down direction will largely affect the estimation of the roll angle. Therefore, the use of the estimated value of the offset error of the first acceleration detector in the next estimation operation leads to a further improvement of the estimation accuracy of the roll angle in the range where the roll angle is small.

The movable object may include a front wheel and a rear wheel, and the speed information detector may include a rear-wheel rotational speed detector that detects a rotational speed of the rear wheel as the information. The estimator may be configured to further estimate a moving speed of the movable object, and may estimate the roll angle of the movable object, the at least one offset error, and the moving speed of the movable object in the current estimation operation on the basis of the detected values of the first and second angular velocity detectors, the detected values of the first, second, and third acceleration detectors, a detected value of the rear-wheel rotational speed detector, the estimated value of the roll angle obtained in the previous estimation operation, the estimated value of the offset error obtained in the previous estimation operation, and an estimated value of the moving speed obtained in the previous estimation operation.

There is a certain relationship among the moving speed of the movable object, the rotational speed of the rear wheel, and the roll angle of the movable object. This allows the moving speed of the movable object to be estimated on the basis of the detected value of the rotational speed of the rear wheel and the estimated value of the roll angle. Therefore, the roll angle of the movable object, the at least one offset error, and the moving speed of the movable object can be estimated in the current estimation operation on the basis of the detected values of the first and second angular velocity detectors, the detected values of the first, second, and third acceleration detectors, the detected value of the rotational speed of the rear wheel, the estimated value of the roll angle obtained in the previous estimation operation, the estimated value of the offset error obtained in the previous estimation operation, and the estimated value of the moving speed obtained in the previous estimation operation.

In the case where the movable object turns in a small radius and at a low speed, the rotational speed of the rear wheel is closer to the moving speed of the movable object compared to the rotational speed of the front wheel. Therefore, the use of the detected value of the rotational speed of the rear wheel makes it possible to estimate the roll angle of the movable object, the at least one offset error, and the moving speed of the movable object with high accuracy.

The movable object may include a front wheel and a rear wheel, and the speed information detector may include a front-wheel rotational speed detector that detects a rotational speed of the front wheel, and a rear-wheel rotational speed estimator that estimates, as the information, a rotational speed of the rear wheel from a detected value of the front-wheel rotational speed detector. The estimator may be configured to further estimate a moving speed of the movable object, and may estimate the roll angle of the movable object, the at least one offset error, and the moving speed of the movable object in the current estimation operation on the basis of the detected values of the first and second angular velocity detectors, the detected values of the first, second, and third acceleration detectors, an estimated value of the rear-wheel rotational speed estimator, the estimated value of the roll angle obtained in the previous estimation operation, the estimated value of the offset error obtained in the previous estimation operation, and an estimated value of the moving speed obtained in the previous estimation operation.

In the case where the movable object turns in a small radius and at a low speed, the turning radius of the front wheel is greater than the turning radius of the rear wheel. Consequently, the rotational speed of the front wheel detected by the front-wheel rotational speed detector is higher than the rotational speed of the rear wheel. The rotational speed of the rear wheel is estimated by the rear-wheel rotational speed estimator based on the detected value of the front-wheel rotational speed detector. This allows the roll angle of the movable object, the at least one offset error, and the moving speed of the movable object to be estimated with high accuracy in the case where the front-wheel rotational speed detector is provided, as in the case where the rear-wheel rotational speed detector is provided.

The estimator may include a Kalman filter that estimates the roll angle of the movable object and the at least one offset error in the current estimation operation by using a relationship among the detected values of the first and second angular velocity detectors, the detected values of the first, second, and third acceleration detectors, the detected value of the speed information detector, the estimated value of the roll angle obtained in the previous estimation operation, and the estimated value of the offset error obtained in the previous estimation operation.

In this case, the estimator can readily be implemented by using the algorithm of the Kalman filter.

According to another aspect of a preferred embodiment of the present invention, transport equipment includes a movable object configured to be movable, the roll angle estimation device, according to a preferred embodiment of the present invention described above, that estimates a roll angle of the movable object, and a processor that performs processing using the roll angle estimated by the roll angle estimation device.

In this transport equipment, the roll angle of the movable portion is estimated with high accuracy by the roll angle estimation device according to a preferred embodiment of the present invention described above. This ensures that the processing by the processor using the roll angle is performed with high accuracy.

According to various preferred embodiments of the present invention, it is possible to estimate the roll angle of a movable object with high accuracy.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Description will now be made of examples in which roll angle estimation devices according to preferred embodiments of the present invention are applied to a vehicle.

Figure 1:
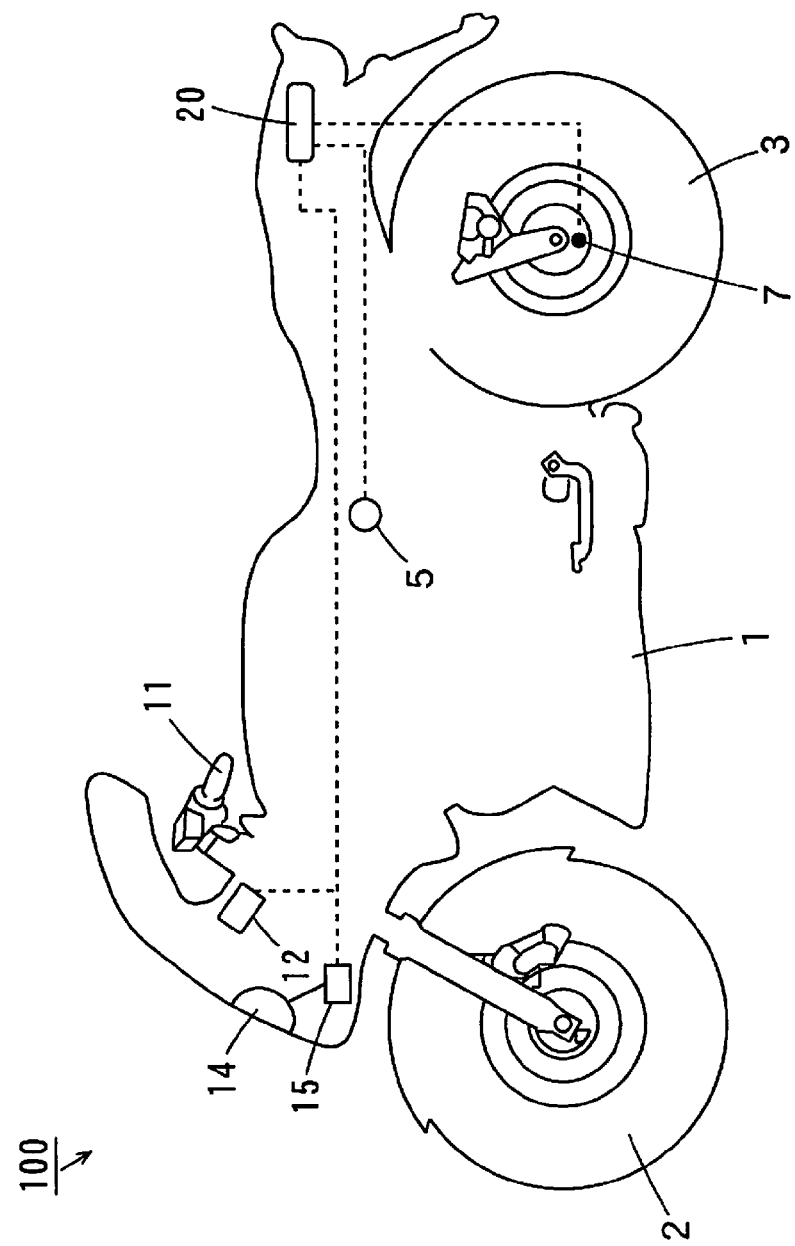
FIG. 1 is a schematic view of the vehicle including a roll angle estimation device according to a preferred embodiment of the present invention.

FIG. 1 is a schematic view of the vehicle including a roll angle estimation device according to a preferred embodiment of the present invention. The vehicle 100 in FIG. 1 preferably is a motorcycle, for example.

As shown in FIG. 1, the vehicle 100 includes a vehicle body 1. The vehicle body 1 includes a front wheel 2 attached to the front thereof and a rear wheel 3 attached to the rear thereof. The vehicle body 1 also includes a sensor group 5 attached to the center thereof. The sensor group 5 will be described later in detail.

A rear-wheel speed sensor 7 that detects the rotational speed of the rear wheel 3 is attached to (the wheel of) the wheel of the rear wheel 3.

At the top on the front side of the vehicle body 1, a handlebar 11 is provided so as to be swingable right and left. A navigation system 12 is provided near the handlebar 11. The vehicle body 1 further includes a headlight 14 and a headlight driving device 15 provided at the front thereof. The headlight driving device 15 controls the aim of the headlight 14. The vehicle body 1 includes an electronic control unit (hereinafter, abbreviated as ECU) 20 provided at the rear thereof.

Signals output from the sensor group 5 and the rear-wheel speed sensor 7 are fed to the ECU 20. The ECU 20 controls the components of the vehicle body 1. The ECU 20 also estimates the roll angle of the vehicle body 1, and feeds the estimated roll angle to, for example, the navigation system 12 and the headlight driving device 15.

In the present preferred embodiment, the sensor group 5, the rear-wheel speed sensor 7, and the ECU 20 preferably constitute the roll angle estimation device, for example.

Figure 2:
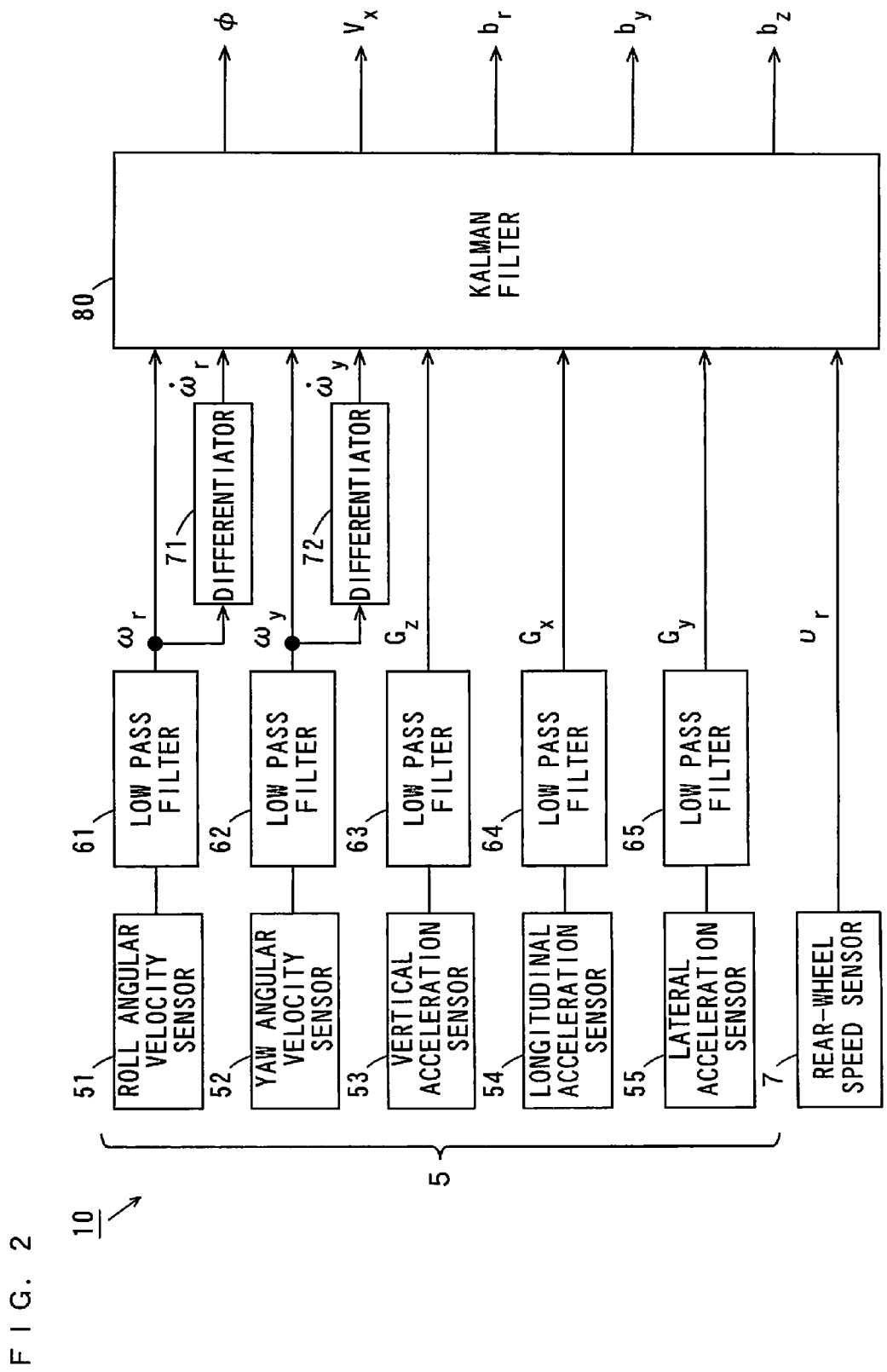
FIG. 2 is a block diagram showing the configuration of the roll angle estimation device according to a preferred embodiment of the present invention.

FIG. 2 is a block diagram showing the configuration of the roll angle estimation device according to a preferred embodiment of the present invention.

The roll angle estimation device 10 in FIG. 2 preferably includes the sensor group 5, the rear-wheel speed sensor 7, low pass filters 61-65, differentiators 71, 72, and a Kalman filter 80. The functions of the Kalman filter 80 are implemented by the ECU 20 in FIG. 1 and a program.

The sensor group 5 includes a roll angular velocity sensor 51, a yaw angular velocity sensor 52, a vertical acceleration sensor 53, a longitudinal acceleration sensor 54, and a lateral acceleration sensor 55.

The roll angular velocity sensor 51 is disposed on the vehicle body 1 so as to detect the roll angular velocity of the vehicle body 1. The roll angular velocity refers to the angular velocity about a longitudinal axis of the vehicle 100.

The yaw angular velocity sensor 52 is disposed on the vehicle body 1 so as to detect the yaw angular velocity of the vehicle body 1. The yaw angular velocity refers to the angular velocity about a vertical axis of the vehicle 100.

The vertical acceleration sensor 53 is disposed on the vehicle body 1 so as to detect the vertical acceleration of the vehicle body 1. The vertical acceleration refers to the acceleration in an up-and-down direction of the vehicle body 1. The longitudinal acceleration sensor 54 is disposed on the vehicle body 1 so as to detect the longitudinal acceleration of the vehicle body 1. The longitudinal acceleration refers to the acceleration in a forward-and-backward direction of the vehicle body 1. The lateral acceleration sensor 55 is disposed on the vehicle body 1 so as to detect the lateral acceleration of the vehicle body 1. The lateral acceleration refers to the acceleration in a right-and-left direction of the vehicle body 1.

The signal output from the roll angular velocity sensor 51 is fed through the low pass filter 61 to the Kalman filter 80 and the differentiator 71 as a roll angular velocity. The low pass filter 61 removes noise from the output signal of the roll angular velocity sensor 51. The differentiator 71 feeds a differential value of the roll angular velocity, as a roll angular acceleration, to the Kalman filter 80. The signal output from the yaw angular velocity sensor 52 is fed through the low pass filter 62 to the Kalman filter 80 and the differentiator 72 as a yaw angular velocity. The low pass filter 62 removes noise from the output signal of the yaw angular velocity sensor 52. The differentiator 72 feeds a differential value of the yaw angular velocity, as a yaw angular acceleration, to the Kalman filter 80.

The signal output from the vertical acceleration sensor 53 is fed through the low pass filter 63 to the Kalman filter 80 as a vertical acceleration. The signal output from the longitudinal acceleration sensor 54 is fed through the low pass filter 64 to the Kalman filter 80 as a longitudinal acceleration. The signal output from the lateral acceleration sensor 55 is fed through the low pass filter 65 to the Kalman filter 80 as a lateral acceleration.

The signal output from the rear-wheel speed sensor 7 is fed to the Kalman filter 80 as a rear-wheel speed. The rear-wheel speed refers to the rotational speed at the outermost periphery of the tire of the rear wheel 3 on the assumption that there is no slip between the road surface and the tire. The rear-wheel speed is practically calculated on the basis of the output signal from the rear-wheel speed sensor 7 and the tire size. For simplification of the explanation, it is assumed in FIG. 2 that the rear-wheel speed sensor 7 outputs a signal that indicates the rear-wheel speed.

Here, the roll angular velocity, roll angular acceleration, yaw angular velocity, yaw angular acceleration, vertical acceleration, longitudinal acceleration, lateral acceleration, and rear-wheel speed are denoted by the symbols shown in the following table. It is noted that a single dot placed at the top of the symbol representing a parameter indicates first order differentiation.

TABLE 1

| Parameter | Meaning |
| --- | --- |
| $\omega_r$ | Roll Angular Velocity |
| $\dot{\omega}_r$ | Roll Angular Acceleration |
| $\omega_y$ | Yaw Angular Velocity |
| $\dot{\omega}_y$ | Yaw Angular Acceleration |
| $G_z$ | Vertical Acceleration |

TABLE 1-continued

| Parameter | Meaning |
| --- | --- |
| $G_x$ | Longitudinal Acceleration |
| $G_y$ | Lateral Acceleration |
| $U_r$ | Rear-Wheel Speed |

On the basis of the above parameters, the Kalman filter 80 estimates and outputs the roll angle, vehicle speed, roll angular velocity sensor offset, yaw angular velocity sensor offset, and vertical acceleration sensor offset.

Here, the vertical plane parallel to the traveling direction of the vehicle 100 is called the longitudinal vertical plane, and the vertical plane perpendicular to the longitudinal vertical plane is called the lateral vertical plane. The roll angle refers to the tilt angle of the vehicle body 1 with respect to the direction of gravity in the lateral vertical plane. The vehicle speed refers to the speed in the traveling direction of the vehicle body 1.

The roll angular velocity sensor offset refers to the offset error of the roll angular velocity sensor 51. The yaw angular velocity sensor offset refers to the offset error of the yaw angular velocity sensor 52. The vertical acceleration sensor offset refers to the offset error of the vertical acceleration sensor 53.

The vehicle speed, roll angular velocity sensor offset, yaw angular velocity sensor offset, and vertical acceleration sensor offset are denoted by the symbols shown in the following table.

TABLE 2

| Parameter | Meaning |
| --- | --- |
| $\phi$ | Roll Angle |
| $V_x$ | Vehicle Speed |
| $b_r$ | Roll Angular Velocity Sensor Offset |
| $b_y$ | Yaw Angular Velocity Sensor Offset |
| $b_z$ | Vertical Acceleration Sensor Offset |

In the roll angle estimation device 10 according to the present preferred embodiment, the roll angular velocity sensor 51, the yaw angular velocity sensor 52, the vertical acceleration sensor 53, the longitudinal acceleration sensor 54, the lateral acceleration sensor 55, and the rear-wheel speed sensor 7 are preferably used to derive five relational expressions in Expressions 17 and 18, which will be described later. Using these relational expressions, two parameters of roll angle $\phi$ and vehicle speed $V_x$ are estimated. That is, there exists redundancy between the number of relational expressions and the number of outputs to be estimated. In other words, the number of relational expressions is greater than the number of outputs to be estimated. The use of this redundancy makes it possible to estimate the roll angular velocity sensor offset $b_r$, the yaw angular velocity sensor offset $b_y$, and the vertical acceleration sensor offset $b_z$.

Figure 3:
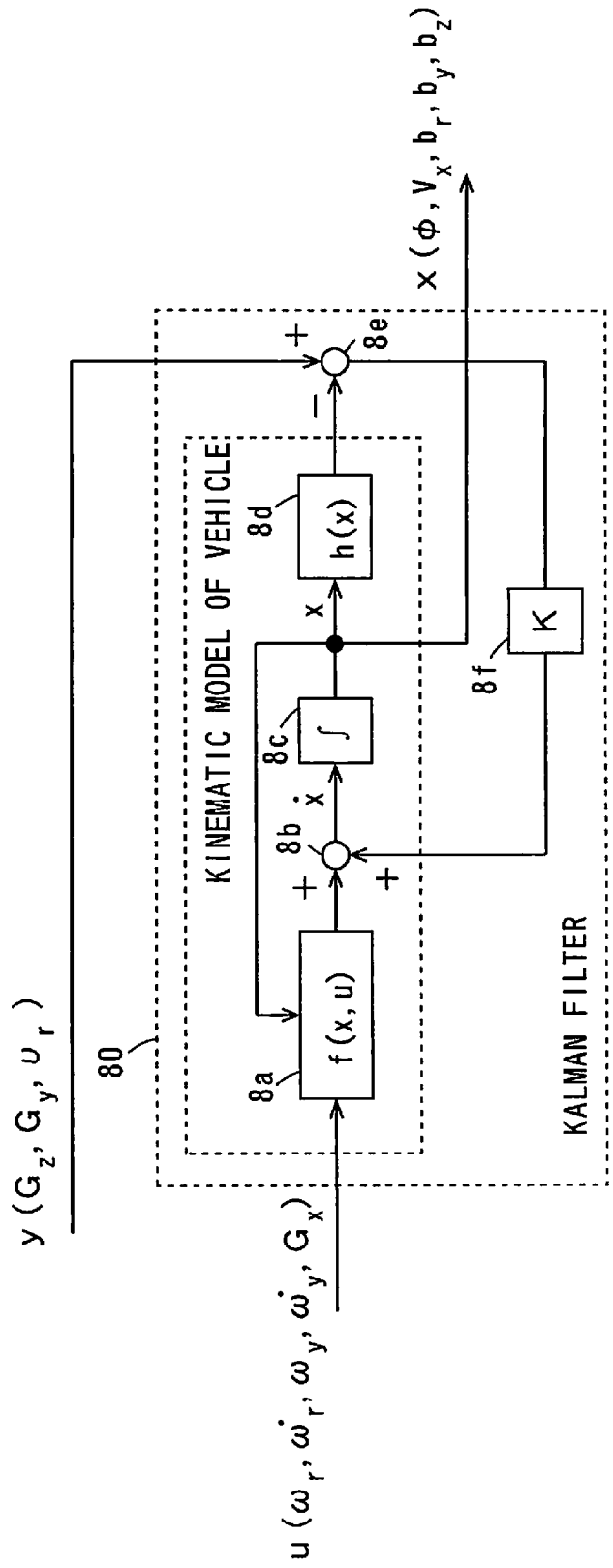
FIG. 3 is a diagram showing the concept of a Kalman filter.

FIG. 3 is a diagram showing the concept of the Kalman filter 80. The Kalman filter 80 in FIG. 3 uses a kinematic model of the vehicle 100 as described below.

In FIG. 3, the Kalman filter 80 preferably includes a system equation 8a, an adding function 8b, an integrating function 8c, an observation equation 8d, a subtracting function 8e, and a Kalman gain 8f. The system equation 8a includes the function f(x, u). The observation equation 8d includes the function h(x). The Kalman gain 8f includes a fifth-order Kalman gain K.

In a current estimation operation, a detected value of the roll angular velocity $\omega_r$, a detected value of the roll angular acceleration (differential value of the roll angular velocity $\omega_r$), a detected value of the yaw angular velocity $\omega_y$, a detected value of the yaw angular acceleration (differential value of the yaw angular velocity $\omega_y$), and a detected value of the longitudinal acceleration $G_x$ are provided as input parameters u to the system equation 8a. Further, the estimated value of the roll angle $\phi$, the estimated value of the vehicle speed $V_x$, the estimated value of the roll angular velocity sensor offset $b_r$, the estimated value of the yaw angular velocity sensor offset $b_y$, and the estimated value of the vertical acceleration sensor offset $b_z$ obtained in the previous estimation operation are provided as input parameters x to the system equation 8a. The system equation 8a outputs a differential value of the roll angle $\phi$, a differential value of the vehicle speed $V_x$, a differential value of the roll angular velocity sensor offset $b_r$, a differential value of the yaw angular velocity sensor offset $b_y$, and a differential value of the vertical acceleration sensor offset $b_z$.

To the differential value of the roll angle $\phi$, the differential value of the vehicle speed $V_x$, the differential value of the roll angular velocity sensor offset $b_r$, the differential value of the yaw angular velocity sensor offset $b_y$, and the differential value of the vertical acceleration sensor offset $b_z$, a fifth-order Kalman gain K obtained in the previous estimation operation is added.

The differential value of the roll angle $\phi$, the differential value of the vehicle speed $V_x$, the differential value of the roll angular velocity sensor offset $b_r$, the differential value of the yaw angular velocity sensor offset $b_y$, and the differential value of the vertical acceleration sensor offset $b_z$, with the Kalman gain K added thereto, are integrated, so that an estimated value of the roll angle $\phi$, an estimated value of the vehicle speed $V_x$, an estimated value of the roll angular velocity sensor offset $b_r$, an estimated value of the yaw angular velocity sensor offset $b_y$, and an estimated value of the vertical acceleration sensor offset $b_z$ according to the current estimation operation are obtained.

Further, the estimated value of the roll angle $\phi$, the estimated value of the vehicle speed $V_x$, the estimated value of the roll angular velocity sensor offset $b_r$, the estimated value of the yaw angular velocity sensor offset $b_y$, and the estimated value of the vertical acceleration sensor offset b, are provided as input parameters x to the observation equation 8d. From the observation equation 8d, a calculated value of the vertical acceleration $G_z$, a calculated value of the lateral acceleration $G_y$, and a calculated value of the rear-wheel speed $v_r$ are obtained.

Further, a detected value of the vertical acceleration $G_z$, a detected value of the lateral acceleration $G_y$, and a detected value of the rear-wheel speed $v_r$ are provided as input parameters y to the Kalman filter 80. The Kalman gain K is calculated on the basis of the differences between the detected values and the calculated values of the vertical acceleration $G_z$, the lateral acceleration $G_y$, and the rear-wheel speed $v_r$.

Deriving the system equation 8a and the observation equation 8d in this kinematic model makes it possible to derive relational expressions of the input parameters u, y and the output parameters x.

In the present preferred embodiment, for simplification of the kinematic model, the following assumptions are made:
(a) The vehicle 100 does not pitch.
(b) There is no slip in the rotational direction between the rear wheel 3 and the road surface.
(c) The sideslip speed of the rear wheel 3 is 0.
(d) The road surface is flat and has no slope.

On the basis of these assumptions (a)-(d), the kinematic model formulae are derived in the following manner.

The roll angle, differential value of the roll angle, pitch angle, differential value of the pitch angle, yaw angle, differential value of the yaw angle, roll angular velocity, yaw angular velocity, and pitch angular velocity are denoted by the symbols shown in the following table.

TABLE 3

| Parameter | Meaning |
|---|---|
| $\phi$ | Roll Angle |
| $\dot{\phi}$ | Differential Value of Roll Angle |
| $\theta$ | Pitch Angle |
| $\dot{\theta}$ | Differential Value of Pitch Angle |
| $\psi$ | Yaw Angle |
| $\dot{\psi}$ | Differential Value of Yaw Angle |
| $\omega_r$ | Roll Angular Velocity |
| $\omega_y$ | Pitch Angular Velocity |
| $\omega_p$ | Yaw Angular Velocity |

First, from a general relational expression of Euler angles and angular velocities, the following expression holds:

Expression 1

$$\begin{bmatrix} \dot{\phi} \\ \dot{\theta} \\ \dot{\psi} \end{bmatrix} = \begin{bmatrix} 1 & \tan\theta\sin\phi & \tan\theta\cos\phi \\ 0 & \cos\phi & -\sin\phi \\ 0 & \sin\phi\sec\theta & \cos\phi\sec\theta \end{bmatrix} \begin{bmatrix} \omega_r \\ \omega_p \\ \omega_y \end{bmatrix} \quad (1)$$

From the above assumption (a), the pitch angle and its differential value both take a value of 0. Therefore, Expression 1 gives the following expression:

Expression 2

$$\begin{bmatrix} \dot{\phi} \\ 0 \\ \dot{\psi} \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} \omega_r \\ \omega_p \\ \omega_y \end{bmatrix} \quad (2)$$

The pitch angular velocity $\omega_p$ can be deleted from the second row of Expression 2. This results in the following expression:

Expression 3

$$\begin{bmatrix} \dot{\phi} \\ \dot{\psi} \end{bmatrix} = \begin{bmatrix} \omega_r \\ \omega_y \sec\phi \end{bmatrix} \quad (3)$$

Figure 4:
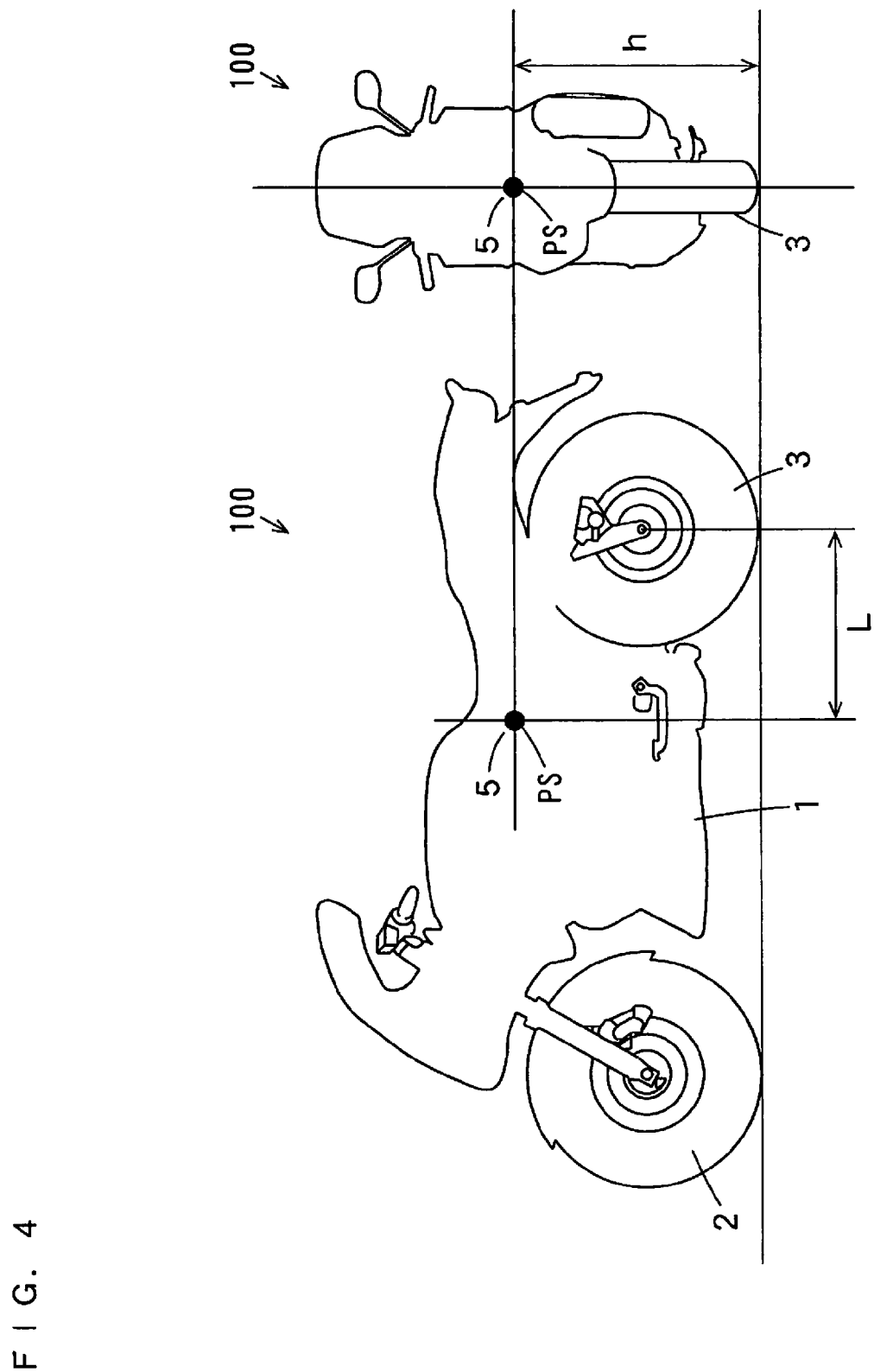
FIG. 4 is a diagram illustrating the attachment position of a sensor group.
Figure 5:
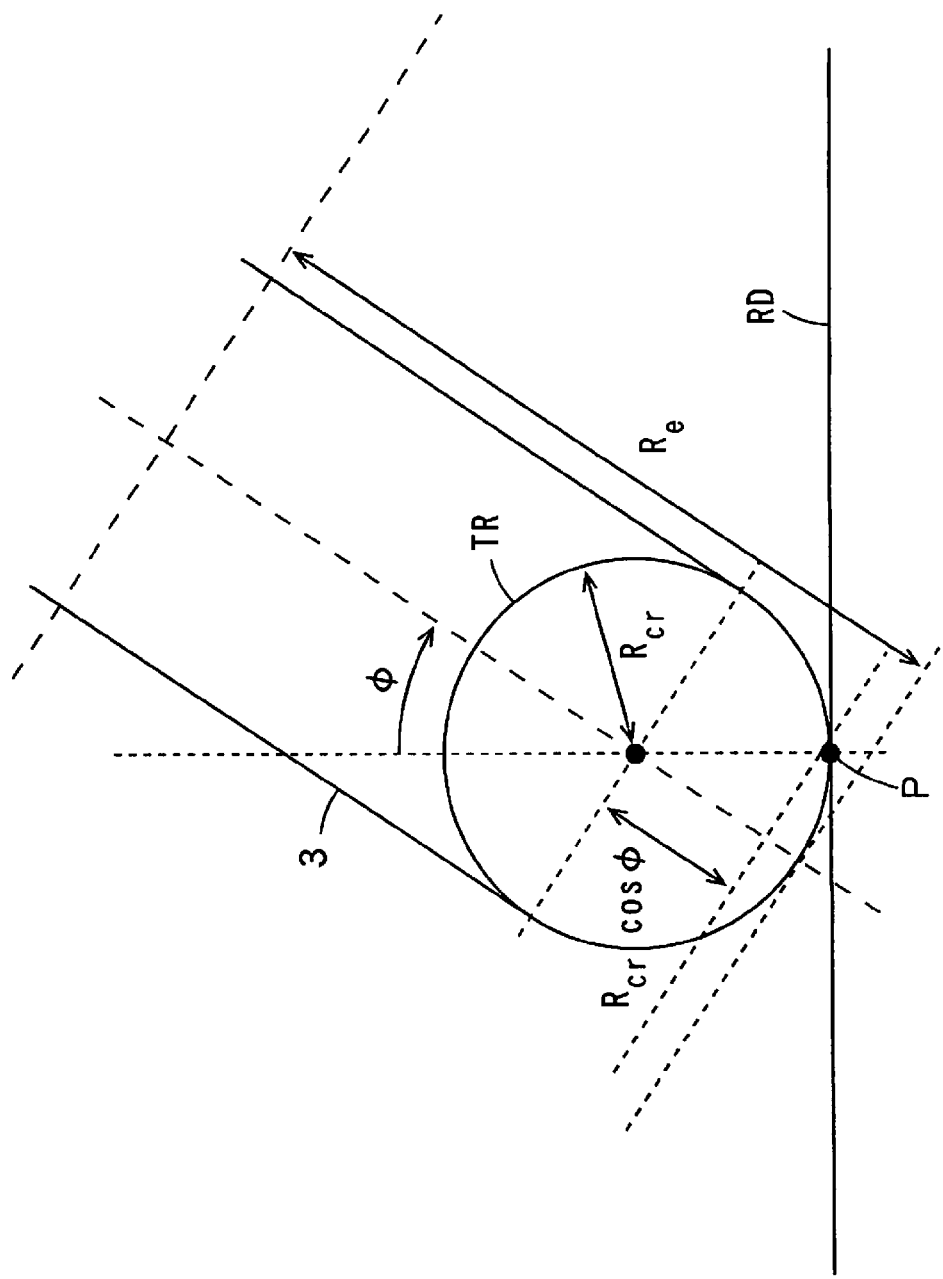
FIG. 5 is a cross-sectional view of the rear wheel.
Figure 6:
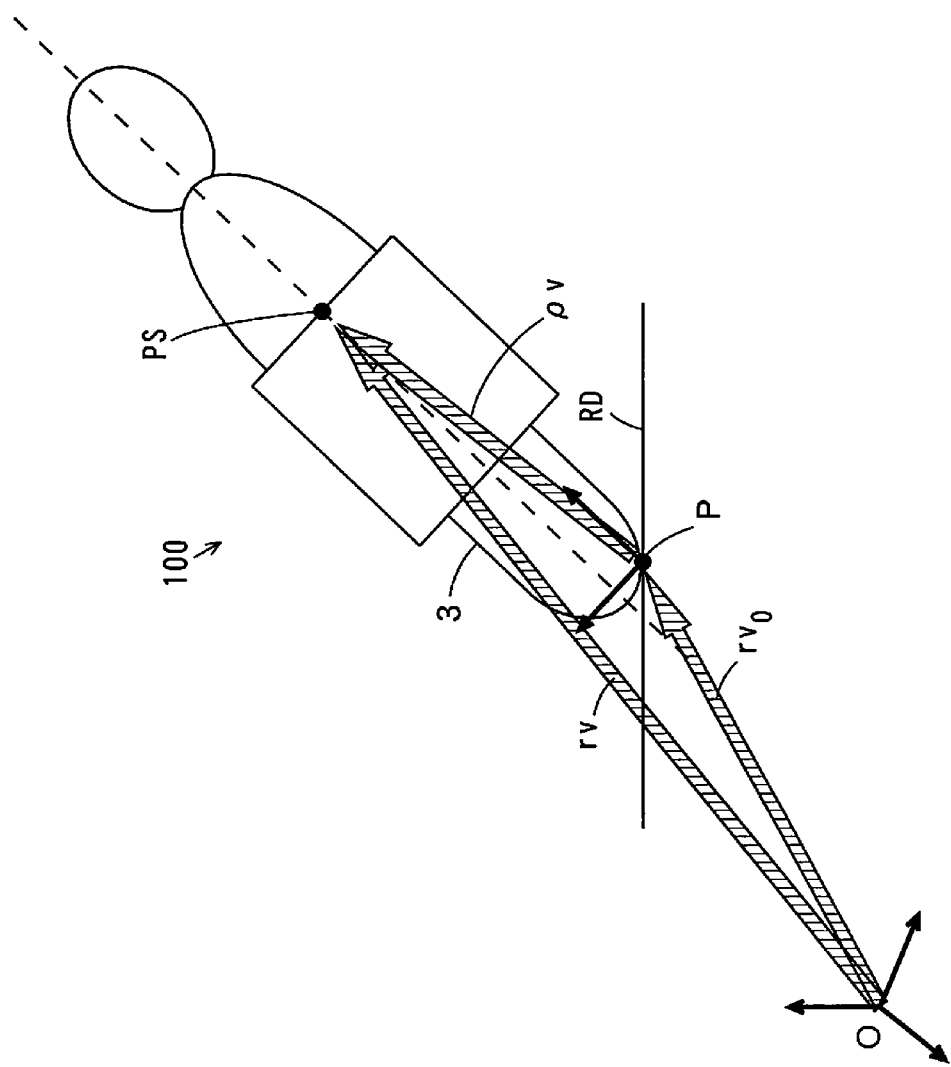
FIG. 6 is a diagram showing the attachment position of the sensor group in vectors.

FIG. 4 is a diagram illustrating the attachment position of the sensor group 5. In FIG. 4, the left side of the vehicle 100 is shown on the left, and the front of the vehicle 100 is shown on the right. FIG. 5 is a cross-sectional view of the rear wheel 3. FIG. 6 is a diagram showing the attachment position of the sensor group 5 in vectors.

In FIG. 4, the attachment position of the sensor group 5 is denoted PS. The horizontal distance from the attachment position PS to the center of the rear wheel 3 is denoted L, and the height from the road surface to the attachment position PS is denoted h.

In FIG. 5, the rear wheel 3 is tilted by a roll angle $\phi$ with respect to the road surface RD. The road surface RD has no slope, from the above assumption (d). The contact point between the tire TR of the rear wheel 3 and the road surface RD is denoted P. Further, the radius of the cross section of the tire TR of the rear wheel 3 is denoted $R_{cr}$, and the radius of the rear wheel 3 is denoted $R_e$.

In FIG. 6, the position vector of the attachment position PS of the sensor group 5 with respect to the origin O of the inertial coordinate system is denoted rv, the position vector of the ground contact point P with respect to the origin O of the inertial coordinate system is denoted $rv_0$, and the vector from the ground contact point P to the attachment position PS of the sensor group 5 is denoted $\rho v$. In this case, the following holds: $rv = rv_0 + \rho v$.

Here, the second-order differential vector of the position vector rv, second-order differential vector of the position vector $rv_0$, second-order differential vector of the vector $\rho v$, and gravitational acceleration vector are denoted by the symbols shown in the following table. It is noted that two dots placed at the top of the symbol representing a parameter indicate second order differentiation.

TABLE 4

| Parameter | Meaning |
|---|---|
| $\ddot{r}v$ | Second-Order Differential Vector of Position Vector rv |
| $\ddot{r}v_0$ | Second-Order Differential Vector of Position Vector $rv_0$ |
| $\ddot{\rho}v$ | Second-Order Differential Vector of Attachment Position Vector $\rho v$ |
| g v | Gravitational Acceleration Vector |

Here, the acceleration vector detected by the vertical acceleration sensor 53, the longitudinal acceleration sensor 54, and the lateral acceleration sensor 55 at the attachment position PS is denoted Gv. The acceleration vector Gv is obtained by adding the gravitational acceleration vector to the second-order differential vector of the position vector rv, as in the following expression:

Expression 4

$$Gv = \ddot{r}v + gv = \ddot{r}v_0 + \ddot{\rho}v + gv \quad (4)$$

The right side of Expression 4 will now be calculated. The vector $\rho v$ in FIG. 6 is represented by the following expression:

Expression 5

$$\rho v = [e]\rho \quad (5)$$

In Expression 5, $[e] = [e_1, e_2, e_3]$. $e_1$, $e_2$, and $e_3$ are base vectors fixed to the vehicle body 1, where $e_1$ is the base vector in a forward direction of the vehicle body 1, $e_2$ is the base vector in a leftward direction of the vehicle body 1, and $e_3$ is the base vector in a vertically upward direction of the vehicle body 1. Further, $\rho$ represents a matrix. From FIGS. 4 and 5, the matrix $\rho$ in Expression 5 is represented by the following expression:

Expression 6

$$\rho = \begin{bmatrix} L \\ R_{cr}\sin\phi \\ h - R_{cr}(1-\cos\phi) \end{bmatrix} \quad (6)$$

From Expression 6, the second-order differential vector of the vector $\rho v$ is determined as in the following expression:

Expression 7

$$\ddot{\rho}v = [e]\begin{bmatrix} a_x(\omega_r, \omega_y, \dot{\omega}_r, \dot{\omega}_y, \phi, L, h, R_{cr}) \\ a_y(\omega_r, \omega_y, \dot{\omega}_r, \dot{\omega}_y, \phi, L, h, R_{cr}) \\ a_z(\omega_r, \omega_y, \dot{\omega}_r, \dot{\omega}_y, \phi, L, h, R_{cr}) \end{bmatrix} \quad (7)$$

In Expression 7, $a_x$, $a_y$, and $a_z$ are functions. The functions $a_x$, $a_y$, $a_z$ can be determined by calculating Expressions 5 and 6. On the transformation from Expression 6 to Expression 7, Expression 3 can be used to eliminate the differential value of the roll angle $\phi$ and the differential value of the yaw angle $\psi$.

Next, the sideslip speed of the vehicle 100 is denoted $V_y$. Using the vehicle speed $V_x$ and the sideslip speed $V_y$, the first-order differential vector of the position vector $rv_0$ in FIG. 6 is represented by the following expression:

Expression 8

$$\dot{r}v_0 = [e0]\begin{bmatrix} V_x \\ V_y \\ 0 \end{bmatrix} \quad (8)$$

In Expression 8, $[e0]=[e0_1, e0_2, e0_3]$. $e0_1$, $e0_2$, and $e0_3$ are base vectors that are obtained by rotating the base vectors $[e]=[e_1, e_2, e_3]$ in the inertial coordinate system by only a yaw angle $\psi$.

From the assumption (c), $V_y=0$. When Expression 8 is subjected to first order differentiation, the second-order differential vector of the position vector $rv_0$ is represented by the following expression:

Expression 9

$$\ddot{r}v_0 = [e]\begin{bmatrix} \dot{V}_x \\ V_x\omega_y \\ -V_x\omega_y\tan\phi \end{bmatrix} \quad (9)$$

Lastly, the gravitational acceleration vector is represented by the following expression:

Expression 10

$$gv = [e]\begin{bmatrix} 0 \\ g\sin\phi \\ g\cos\phi \end{bmatrix} \quad (10)$$

In Expression 10, g represents the magnitude of the gravitational acceleration.

From Expressions 4, 7, 9, and 10, the acceleration vector Gv detected at the attachment position PS is represented by the following expression:

Expression 11

$$Gv = \ddot{r}v + gv = \ddot{r}v_0 + \ddot{\rho}v + gv = [e]\begin{bmatrix} \dot{V}_x + a_x(\omega_r, \omega_y, \dot{\omega}_r, \dot{\omega}_y, \phi, L, h, R_{cr}) \\ V_x\omega_y + a_y(\omega_r, \omega_y, \dot{\omega}_r, \dot{\omega}_y, \phi, L, h, R_{cr}) + g\sin\phi \\ -V_x\omega_y\tan\phi + a_z(\omega_r, \omega_y, \dot{\omega}_r, \dot{\omega}_y, \phi, L, h, R_{cr}) + g\cos\phi \end{bmatrix} \quad (11)$$

Here, using the longitudinal acceleration $G_x$ detected by the longitudinal acceleration sensor 54, the lateral acceleration $G_y$ detected by the lateral acceleration sensor 55, and the vertical acceleration $G_z$ detected by the vertical acceleration sensor 53, the acceleration vector Gv detected at the attachment position PS is represented by the following expression:

$$Gv = [e][G_x, G_y, G_z]$$

Therefore, from Expression 11, the longitudinal acceleration $G_x$, the lateral acceleration $G_y$, and the vertical acceleration $G_z$ become as follows:

Expression 12

$$\begin{bmatrix} G_x \\ G_y \\ G_z \end{bmatrix} = \begin{bmatrix} \dot{V}_x + a_x(\omega_r, \omega_y, \dot{\omega}_r, \dot{\omega}_y, \phi, L, h, R_{cr}) \\ V_x\omega_y + a_y(\omega_r, \omega_y, \dot{\omega}_r, \dot{\omega}_y, \phi, L, h, R_{cr}) + g\sin\phi \\ -V_x\omega_y\tan\phi + a_z(\omega_r, \omega_y, \dot{\omega}_r, \dot{\omega}_y, \phi, L, h, R_{cr}) + g\cos\phi \end{bmatrix} \quad (12)$$

Next, the relationship between the rear-wheel speed $v_r$ and the vehicle speed $V_x$ is determined. From the above assumption (b), there is no slip between the rear wheel 3 and the road surface. Therefore, from FIG. 5, the following relationship holds between the rear-wheel speed $v_r$ and the vehicle speed $V_x$:

Expression 13

$$\frac{V_x}{R_e - R_{cr}(1-\cos\phi)} = \frac{v_r}{R_e} \quad (13)$$

From Expression 13, the following expression is determined:

Expression 14

$$v_r = \frac{R_e}{R_e - R_{cr}(1-\cos\phi)}V_x \quad (14)$$
$$= \frac{1}{1 - R_{cr}/R_e(1-\cos\phi)}V_x$$

From Expressions 3, 12, and 14, the following expressions are determined:

Expression 15

$$\frac{d}{dt}\begin{bmatrix} \phi \\ V_x \end{bmatrix} = \begin{bmatrix} \omega_r \\ G_x - a_x(\omega_r, \omega_y, \dot{\omega}_r, \dot{\omega}_y, \phi, L, h, R_{cr}) \end{bmatrix} \quad (15)$$

-continued

Expression 16

$$\begin{bmatrix} G_y \\ G_z \\ v_r \end{bmatrix} = \begin{bmatrix} V_x\omega_y + a_y(\omega_r, \omega_y, \dot{\omega}_r, \dot{\omega}_y, \phi, L, h, R_{cr}) + g\sin\phi \\ -V_x\omega_y\tan\phi + a_z(\omega_r, \omega_y, \dot{\omega}_r, \dot{\omega}_y, \phi, L, h, R_{cr}) + g\cos\phi \\ \dfrac{1}{1 - R_{cr}/R_e(1-\cos\phi)}V \end{bmatrix} \quad (16)$$

The use of Expression 5 as the system equation and Expression 16 as the observation equation enables application of an extended Kalman filter.

Further, even when the roll angular velocity sensor offset $b_r$, the yaw angular velocity sensor offset $b_y$, and the vertical acceleration sensor offset $b_z$ change, the changes in their values are slow compared to the motion of the vehicle 100. Therefore, the differential value of the roll angular velocity sensor offset $b_r$, the differential value of the yaw angular velocity sensor offset $b_y$, and the differential value of the vertical acceleration sensor offset $b_z$ can each be regarded as 0.

Furthermore, by replacing the roll angular velocity $\omega_r$, the yaw angular velocity $\omega_y$, and the vertical acceleration $G_z$ in Expressions 15 and 16 by $\omega_r\text{-}b_r$, $\omega_y\text{-}b_y$, and $G_z\text{-}b_z$, respectively, the following expressions can be derived:

Expression 17

$$\frac{d}{dt}\begin{bmatrix} \phi \\ V_x \\ b_r \\ b_y \\ b_z \end{bmatrix} = \begin{bmatrix} \omega_r - b_r \\ G_x - a_x(\omega_r - b_r, \omega_y - b_y, \dot{\omega}_r, \dot{\omega}_y, \phi, L, h, R_{cr}) \\ 0 \\ 0 \\ 0 \end{bmatrix} \quad (17)$$

Expression 18

$$\begin{bmatrix} G_y \\ G_z \\ v_1 \end{bmatrix} = \begin{bmatrix} V_x(\omega_y - b_y)ia_y(\omega_r - b_r, \omega_y - b_y, \dot{\omega}_r, \dot{\omega}_y, \phi, L, h, R_{cr})ig\sin\phi \\ -V_x(\omega_y - b_y)\tan\phi + a_z(\omega_r - b_r, \omega_y - b_y, \dot{\omega}_r, \dot{\omega}_y, \phi, L, h, R_{cr}) + g\cos\phi \\ \dfrac{1}{1 - R_{cr}/R_e(1-\cos\phi)}V \end{bmatrix} \quad (18)$$

In Expressions 17 and 18, the roll angular velocity sensor offset $b_r$, the yaw angular velocity sensor offset $b_y$, and the vertical acceleration sensor offset $b_z$ are taken into consideration.

Application of the extended Kalman filter by using Expression 17 as the system equation and Expression 18 as the observation equation enables estimation of the roll angle $\phi$, the vehicle speed $V_x$, the roll angular velocity sensor offset $b_r$, the yaw angular velocity sensor offset $b_y$, and the vertical acceleration sensor offset $b_z$.

Here, the right side of Expression 17 corresponds to the function f(x, u) in FIG. 3, and the right side of Expression 18 corresponds to the function h(x) in FIG. 3.

An angular velocity sensor is susceptible to an offset error compared to an acceleration sensor. Therefore, in the present preferred embodiment, an offset error of the roll angular velocity sensor 51 (roll angular velocity sensor offset $b_r$) and an offset error of the yaw angular velocity sensor 52 (yaw angular velocity sensor offset $b_y$) are estimated. The use of the estimated values of the roll angular velocity sensor offset $b_r$ and the yaw angular velocity sensor offset $b_y$ in a next estimation operation sufficiently improves the estimation accuracy of the roll angle $\phi$.

Further, if offset errors of the three acceleration sensors (vertical acceleration sensor 53, longitudinal acceleration sensor 54, and lateral acceleration sensor 55) can be estimated, it will lead to a further improvement in the estimation accuracy of the roll angle $\phi$. When estimating the offset errors of the three acceleration sensors, however, observability cannot be maintained. Therefore, in the present preferred embodiment, an offset error of the vertical acceleration sensor 53 (vertical acceleration sensor offset $b_z$) is estimated for the following reason. In the range where the roll angle $\phi$ of the vehicle body 1 is small, the vertical acceleration of the vehicle body 1 hardly changes. If the detected value of such a vertical acceleration changes due to the vertical acceleration sensor offset $b_z$, the change in the detected value of the vertical acceleration will largely affect the estimation of the roll angle $\phi$. Therefore, the estimated value of the vertical acceleration sensor offset $b_z$ is used in a next estimation operation, to further improve the estimation accuracy of the roll angle $\phi$ in the range where the roll angle $\phi$ is small.

Figure 7:
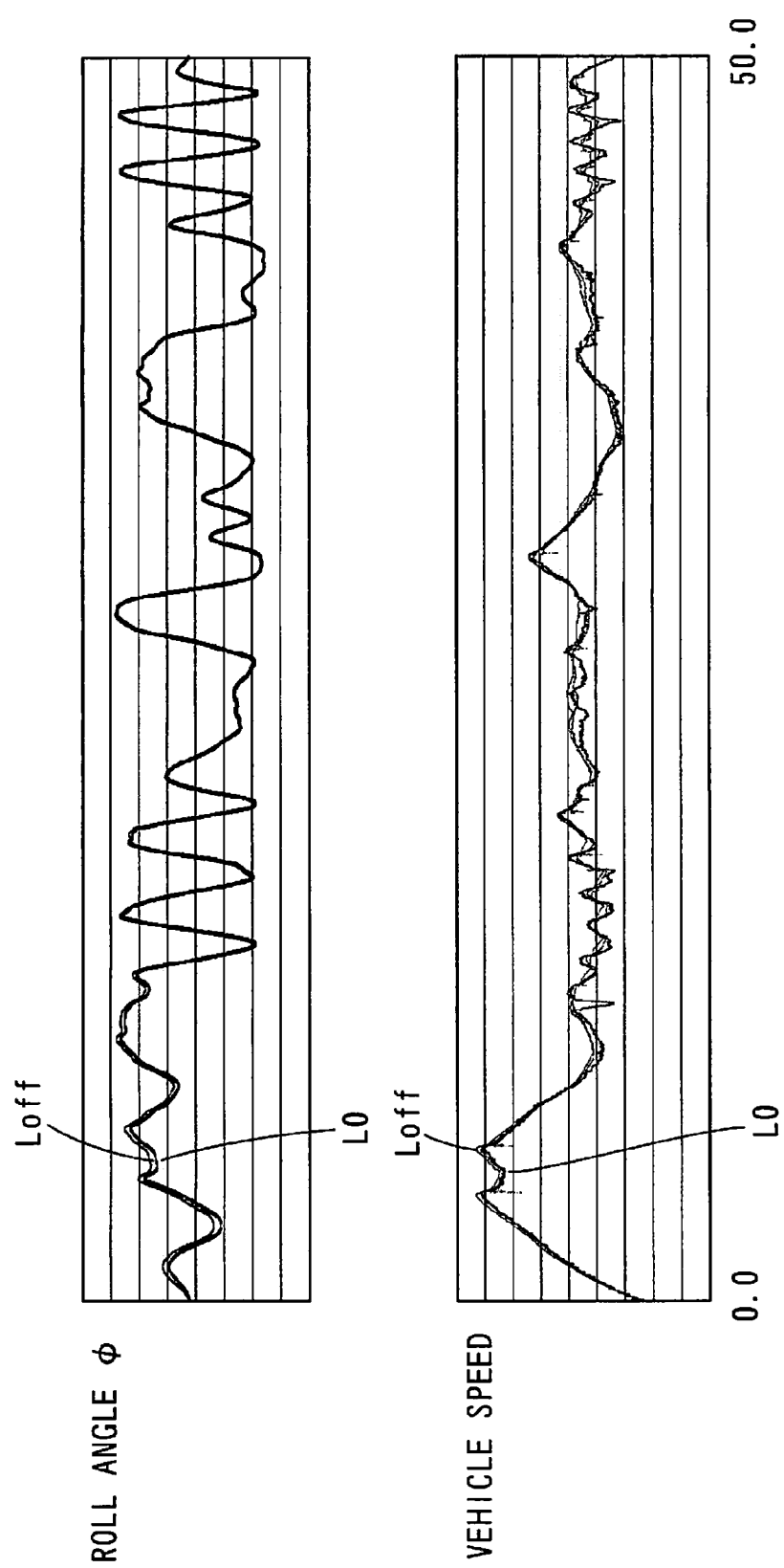
FIG. 7 includes diagrams showing the transitions over time of values of respective parameters estimated by the roll angle estimation device.
Figure 8:
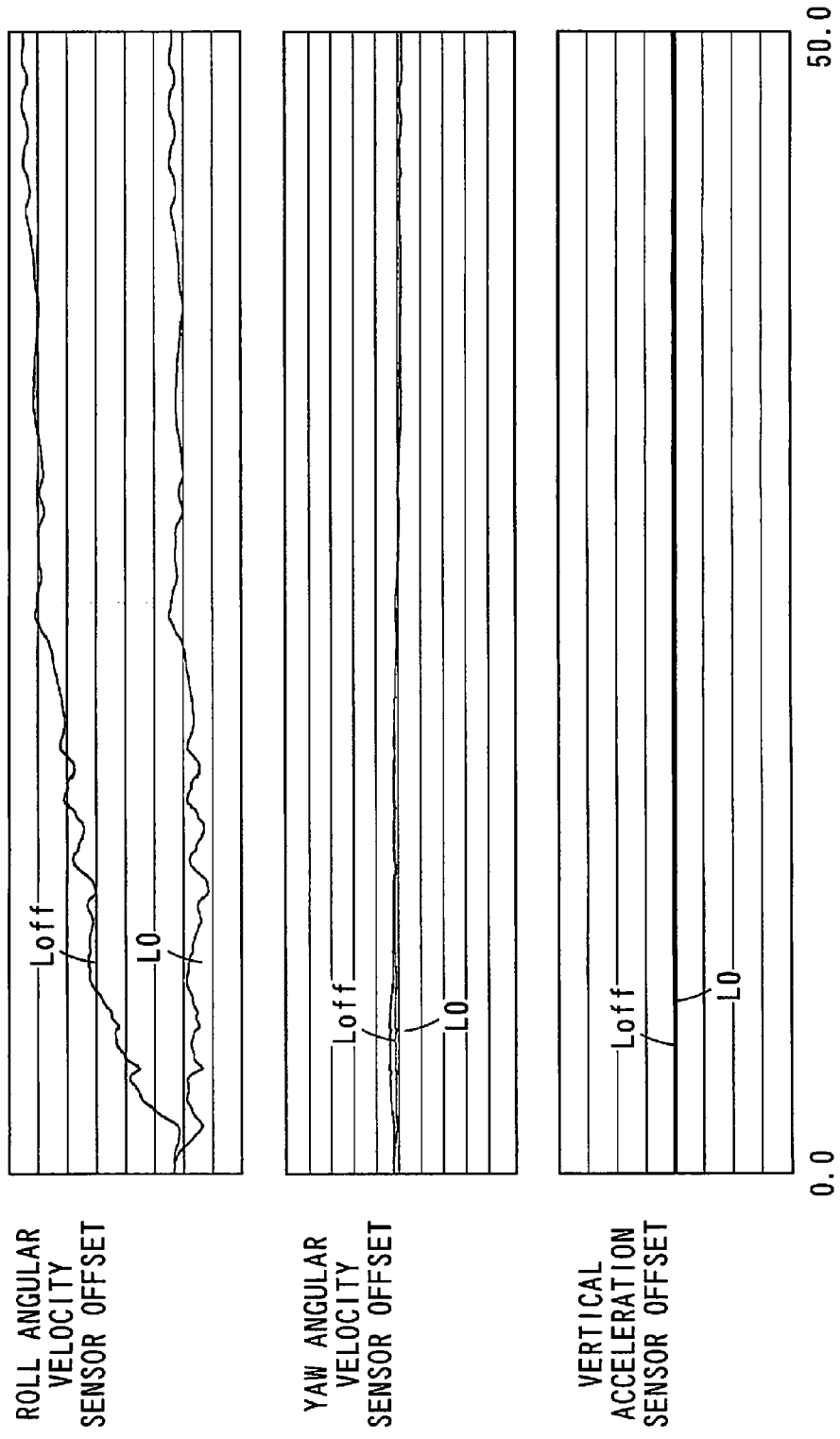
FIG. 8 includes diagrams showing the transitions over time of estimated values of respective parameters.

FIGS. 7 and 8 include diagrams showing the transitions over time of estimated values of the respective parameters in the presence and absence of an offset error in the roll angular velocity sensor 51.

Here, the roll angular velocity sensor 51, the yaw angular velocity sensor 52, the vertical acceleration sensor 53, the longitudinal acceleration sensor 54, the lateral acceleration sensor 55, and the rear-wheel speed sensor 7, each having no offset error, were attached to the vehicle 100, and estimated values of the respective parameters were calculated on the basis of the detected values of the roll angular velocity sensor 51, the yaw angular velocity sensor 52, the vertical acceleration sensor 53, the longitudinal acceleration sensor 54, the lateral acceleration sensor 55, and the rear-wheel speed sensor 7 that were obtained while the vehicle 100 was actually running. Further, an offset error of about 3 deg/s, for example, was added to the detected value of the roll angular velocity sensor 51, and the estimated values of the respective parameters were calculated. FIG. 7 shows the estimated values of the roll angle $\phi$ and the vehicle speed $V_x$, and FIG. 8 shows the estimated values of the roll angular velocity sensor offset $b_r$, the yaw angular velocity sensor offset $b_y$, and the vertical acceleration sensor offset $b_z$.

The symbol L0 indicates the estimated values of the respective parameters in the case where no offset error is added to a detected value of the roll angular velocity sensor 51, while the symbol Loff indicates the estimated values of the respective parameters in the case where the offset error has been added to the detected value of the roll angular velocity sensor 51.

As shown in FIG. 7, the estimated value of the roll angle φ in the case where the offset error has been added to the detected value of the roll angular velocity sensor 51 comes to agree with the estimated value of the roll angle φ in the case where no offset error is added to the detected value of the roll angular velocity sensor 51 in a short period of time. Further, the estimated value of the vehicle speed $V_x$ in the case where the offset error has been added to the detected value of the roll angular velocity sensor 51 is substantially equal to the estimated value of the vehicle speed $V_x$ in the case where no offset error is added to the detected value of the roll angular velocity sensor 51.

As shown in FIG. 8, the difference between the estimated value of the roll angular velocity sensor offset $b_r$ in the case where the offset error has been added to the detected value of the roll angular velocity sensor 51 and the estimated value of the roll angular velocity sensor offset $b_r$ in the case where no offset error is added to the detected value of the roll angular velocity sensor 51 is equal to the value (e.g., about 3 deg/s) of the offset error.

It is noted that the estimated values of the yaw angular velocity sensor offset $b_y$ and the vertical acceleration sensor offset $b_z$ were almost 0 irrespective of whether the offset error was added to the detected value of the roll angular velocity sensor 51 or not.

It is apparent from the above description that according to the roll angle estimation device 10 of the present preferred embodiment, the roll angle φ can be estimated with high accuracy even in the case where the roll angular velocity sensor 51 has an offset error.

According to the roll angle estimation device 10 of the present preferred embodiment, the roll angle φ and the vehicle speed $V_x$, as well as the roll angular velocity sensor offset $b_r$, the yaw angular velocity sensor offset $b_y$, and the vertical acceleration sensor offset $b_z$ are estimated, and the estimated values of the roll angular velocity sensor offset $b_r$, the yaw angular velocity sensor offset $b_y$, and the vertical acceleration sensor offset $b_z$ are used in a next estimation operation. This compensates the degradation in estimation accuracy of the roll angle φ due to the roll angular velocity sensor offset $b_r$, the yaw angular velocity sensor offset $b_y$, and the vertical acceleration sensor offset $b_z$. As a result, the roll angle φ can be estimated with high accuracy.

Further, the estimated values of the offset errors of the roll angular velocity sensor 51 and the yaw angular velocity sensor 52, which are susceptible to offsets compared to the acceleration sensors, are used in the next estimation operation. This sufficiently improves the estimation accuracy of the roll angle φ.

Furthermore, the estimated value of the offset error of the vertical acceleration sensor 53 is used in the next estimation operation. This further improves the estimation accuracy of the roll angle φ in the range where the roll angle φ is small.

Further, the detected value of the rear-wheel speed $v_r$, detected by the rear-wheel speed sensor 7, is used in an estimation operation. This makes it possible to estimate the roll angle φ of the vehicle body 1, the roll angular velocity sensor offset $b_r$, the yaw angular velocity sensor offset $b_y$, the vertical acceleration sensor offset $b_z$, and the vehicle speed $V_x$ with high accuracy even in the case where the vehicle 100 turns in a small radius and at a low speed.

As described above, the roll angle φ of the vehicle body 1 is estimated with high accuracy by the roll angle estimation device 10. This ensures that the navigation system 12 and the headlight driving device 15 operate with precision on the basis of the roll angle φ estimated by the ECU 20.

Figure 9:
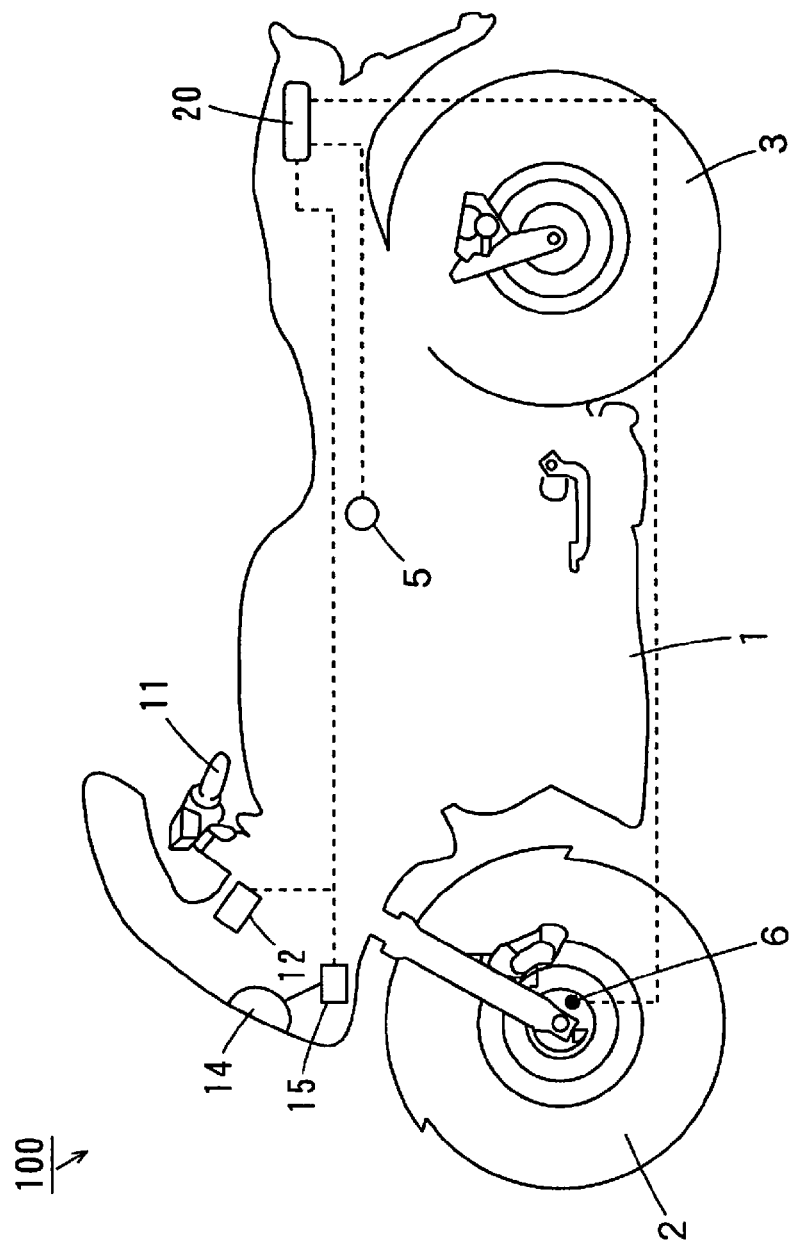
FIG. 9 is a schematic view of the vehicle including a roll angle estimation device according to another preferred embodiment of the present invention.

In the roll angle estimation device 10 according to the above preferred embodiment, the rear-wheel speed sensor 7 that detects the rotational speed of the rear wheel 3 is preferably attached to (the wheel of) the wheel of the rear wheel 3, for example. Alternatively, as shown in FIG. 9, instead of the rear-wheel speed sensor 7, a front-wheel speed sensor 6 that detects the rotational speed of the front wheel 2 may be attached to (the wheel of) the wheel of the front wheel 2. FIG. 9 is a schematic view of the vehicle including the roll angle estimation device according to another preferred embodiment of the present invention. More specifically, while the rear-wheel speed $v_r$ detected by the rear-wheel speed sensor 7 is preferably used in the above preferred embodiment, instead of the rear-wheel speed $v_r$ detected by the rear-wheel speed sensor 7, the front-wheel speed detected by the front-wheel speed sensor 6 shown in FIG. 9 may be used to estimate the rear-wheel speed $v_r$ therefrom.

In the case where the vehicle 100 turns in a small radius and at a low speed, the turning radius of the front wheel 2 is greater than the turning radius of the rear wheel 3. Consequently, the rotational speed of the front wheel 2 detected by the front-wheel speed sensor 6 is higher than the rotational speed of the rear wheel 3. The ECU 20 estimates the rear-wheel speed $v_r$ from the rotational speed of the front wheel 2 detected by the front-wheel speed sensor 6.

Figure 10:
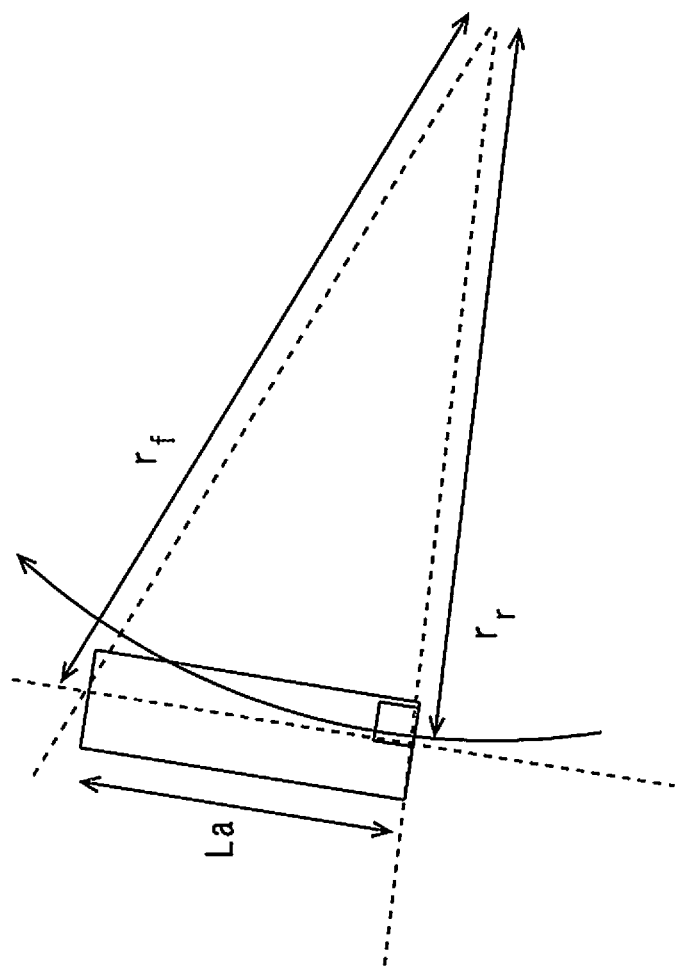
FIG. 10 is a diagram showing the turning radii of the front wheel and the rear wheel during turning of the vehicle.

FIG. 10 is a diagram showing the turning radii of the front wheel 2 and the rear wheel 3 during the turning of the vehicle 100. From the above assumption (c), the sideslip speed of the rear wheel 3 is 0. Therefore, between the turning radius $r_f$ of the front wheel 2 and the turning radius $r_r$ of the rear wheel 3, the following relationship holds:

Expression 19

$$r_f^2 = r_r^2 + La^2 \tag{19}$$

Here, La denotes the wheel base length of the vehicle 100. From Expression 19, the following expression is obtained:

Expression 20

$$\frac{r_f}{r_r} = \sqrt{1 + \frac{La^2}{r_r^2}} \tag{20}$$

The ratio between the speed $V_f$ at the ground contact point of the front wheel 2 and the speed $V_r$ at the ground contact point of the rear wheel 3 is equal to that between the turning radius $r_f$ of the front wheel 2 and the turning radius $r_r$ of the rear wheel 3. Therefore, the following Expression holds:

Expression 21

$$\frac{V_f}{V_r} = \frac{r_f}{r_r} = \sqrt{1 + \frac{La^2}{r_r^2}} \tag{21}$$

Furthermore, assuming that the vehicle 100 is turning steadily, the turning radius $r_r$ of the rear wheel 3 is expressed, using the speed $V_r$ at the ground contact point of the rear wheel 3 and the roll angle φ, by the following expression:

Expression 22

$$r_r = \frac{V_r^2}{g\tan\phi} \quad (22)$$

In Expression 22, g represents the magnitude of the gravitational acceleration. When Expression 22 is substituted in Expression 21, the following expression is derived:

Expression 23

$$V_r^4 - V_f^2 V_r^2 + La^2 g^2 \tan^2\phi = 0 \quad (23)$$

From Expression 23, the speed $V_r$ at the ground contact point of the rear wheel 3 is represented by the following expression:

Expression 24

$$V_r = \sqrt{\frac{V_f^2 + \sqrt{V_f^4 - 4La^2 g^2 \tan^2\phi}}{2}} \quad (24)$$

Expression 24 has a solution only when the condition represented by the following expression is satisfied:

Expression 25

$$V_f^4 - 4La^2 g^2 \tan^2\phi \geq 0 \quad (25)$$

The condition represented by Expression 25 may not be satisfied when the turning radius of the vehicle 100 is small. In order to ensure that there is a solution even in such a case, Expression 24 is modified as follows:

Expression 26

$$V_r = \begin{cases} \sqrt{\dfrac{V_f^2 + \sqrt{V_f^4 - 4La^2 g^2 \tan^2\phi}}{2}} & \text{(when } V_f^4 \geq 4La^2 g^2 \tan^2\phi\text{)} \\ \dfrac{V_f}{\sqrt{2}} & \text{(when } V_f^4 < 4La^2 g^2 \tan^2\phi\text{)} \end{cases} \quad (26)$$

For the roll angle φ in Expression 26, the estimated value of the roll angle φ obtained in the previous estimation operation is used.

From Expression 26, the relationship between the speed $V_f$ at the ground contact point of the front wheel 2 and the speed $V_r$ at the ground contact point of the rear wheel 3 is determined. Accordingly, it is possible to calculate the rear-wheel speed $V_r$ from the rotational speed of the front wheel 2 (hereinafter, referred to as the front-wheel speed $v_f$) detected by the front-wheel speed sensor 6.

Figure 11:
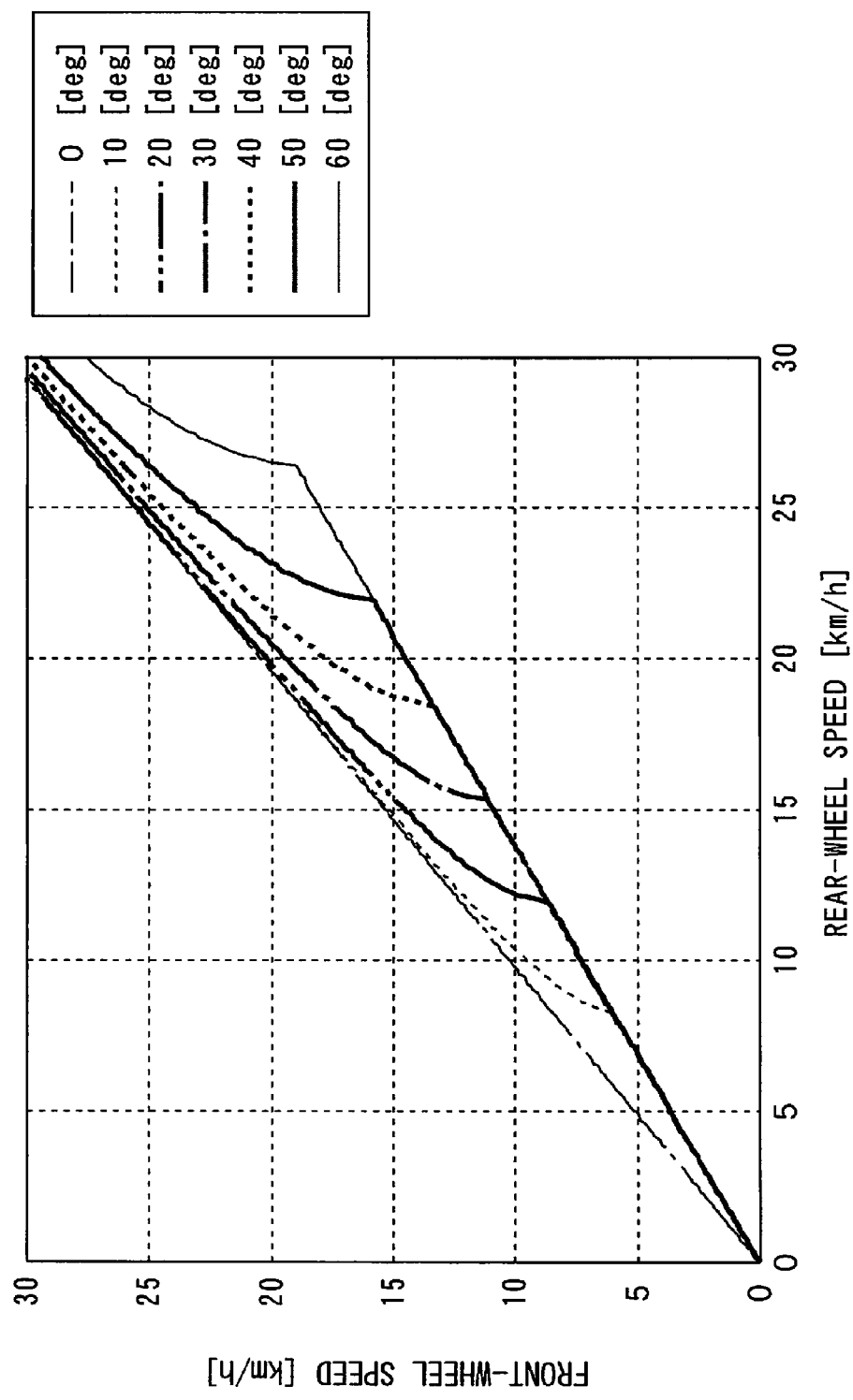
FIG. 11 is a diagram showing the calculation results of the relationship between the front-wheel speed and the rear-wheel speed.

FIG. 11 is a diagram showing the calculation results of the relationship between the front-wheel speed $v_f$ and the rear-wheel speed $v_r$. In FIG. 11, the horizontal axis represents rear-wheel speed $v_r$, and the vertical axis represents front-wheel speed $v_f$.

As shown in FIG. 11, it is possible to estimate the rear-wheel speed $v_r$ from the front-wheel speed $v_f$ detected by the front-wheel speed sensor 6. Therefore, even in the case where the front-wheel speed sensor 6 alone is provided, the roll angle φ of the vehicle body 1, the vehicle speed $V_x$, the roll angular velocity sensor offset $b_r$, the yaw angular velocity sensor offset $b_y$, and the vertical acceleration sensor offset $b_z$ can be estimated with high accuracy, as in the case where the rear-wheel speed sensor 7 is provided.

The roll angular velocity sensor 51 and the yaw angular velocity sensor 52 in the above preferred embodiment may be replaced with two or more angular velocity sensors that detect angular velocities about two or more axes extending in directions other than the frontward-and-backward direction and the up-and-down direction of the vehicle 100. In this case, the detected values of the two or more angular velocity sensors can be converted to a roll angular velocity $\omega_r$ and a yaw angular velocity $\omega_y$ in a geometric manner, so that Expressions 17 and 18 can be used.

In addition to the roll angular velocity sensor 51 and the yaw angular velocity sensor 52 in the above preferred embodiment, an angular velocity sensor that detects an angular velocity about the axis in a right-and-left direction of the vehicle 100 may be used. This can further improve the estimation accuracy of the roll angle φ.

The vertical acceleration sensor 53, the longitudinal acceleration sensor 54, and the lateral acceleration sensor 55 in the above preferred embodiment may be replaced with three or more acceleration sensors that detect accelerations in three or more directions other than the up-and-down direction, the frontward-and-backward direction, and the right-and-left direction of the vehicle 100. In this case, the detected values of the three or more acceleration sensors can be converted to a vertical acceleration $G_z$, a longitudinal acceleration $G_x$, and a lateral acceleration $G_y$ in a geometric manner, so that Expressions 17 and 18 can be used.

While the roll angular velocity sensor offset $b_r$ and the yaw angular velocity sensor offset $b_y$ are preferably estimated by the Kalman filter 80 in the above preferred embodiment, not limited thereto, the roll angular velocity sensor offset $b_r$ alone may be estimated, or the yaw angular velocity sensor offset $b_y$ alone may be estimated. In the case of estimating only the roll angular velocity sensor offset $b_r$, the calculation may be performed by setting the other sensor offset values to zero. Similarly, in the case of estimating only the yaw angular velocity sensor offset $b_y$, the calculation may be performed by setting the other sensor offset values to zero.

While the vertical acceleration sensor offset $b_z$ is preferably estimated in the above preferred embodiment, not limited thereto, an offset error of the longitudinal acceleration sensor 54 may be estimated, or an offset error of the lateral acceleration sensor 55 may be estimated.

While the rear-wheel speed $v_r$ is preferably used as one of the input parameters to the Kalman filter 80 in the above preferred embodiment, not limited thereto, a vehicle speed detected by a speed sensor capable of measuring the running speed of the vehicle 100 (vehicle speed) may be used as one of the input parameters to the Kalman filter 80.

While the vehicle speed $V_x$ is preferably estimated by the Kalman filter 80 in the above preferred embodiment, for example in the case where the vehicle speed is detected by a speed sensor, the vehicle speed $V_x$ does not have to be estimated by the Kalman filter 80.

While the Kalman filter 80 is preferably implemented by the ECU 20 and the program in the above preferred embodiment, not limited thereto, a portion or all of the functions of the Kalman filter 80 may be implemented by hardware such as an electronic circuit.

The Kalman filter 80 in the above preferred embodiment may be replaced with another adaptive filtering approach. For example, a least-mean-square (LMS) adaptive filter or H∞ filtering may be used.

While the roll angle estimation device 10 is preferably applied to a motorcycle in the above preferred embodiment, not limited thereto, the roll angle estimation device 10 may be applied to a variety of transport equipment such as a four-wheeled motor vehicle, motor tricycle, or other vehicle, or a ship or vessel.

While the roll angle φ estimated by the roll angle estimation device 10 is used in the navigation system 12 and the headlight driving device 15 in the above preferred embodiment, not limited thereto, the roll angle φ estimated by the roll angle estimation device 10 may be used for a variety of processing such as another control of the transport equipment.

In the following paragraphs, non-limiting examples of correspondences between various elements recited in the claims below and those described above with respect to various preferred embodiments of the present invention are explained.

In the preferred embodiments described above, the axis in the forward-and-backward direction of the vehicle 100 is an example of the first axis, the axis in the up-and-down direction of the vehicle 100 is an example of the second axis, the roll angular velocity $\omega_r$ is an example of the first angular velocity, the yaw angular velocity $\omega_y$ is an example of the second angular velocity, the roll angular velocity sensor 51 is an example of the first angular velocity detector, and the yaw angular velocity sensor 52 is an example of the second angular velocity detector.

Further, the up-and-down direction of the vehicle 100 is an example of the first direction, the forward-and-backward direction of the vehicle 100 is an example of the second direction, the right-and-left direction of the vehicle 100 is an example of the third direction, the vertical acceleration $G_z$ is an example of the first acceleration, the longitudinal acceleration $G_x$ is an example of the second acceleration, the lateral acceleration $G_y$ is an example of the third acceleration, the vertical acceleration sensor 53 is an example of the first acceleration detector, the longitudinal acceleration sensor 54 is an example of the second acceleration detector, and the lateral acceleration sensor 55 is an example of the third acceleration detector.

Furthermore, the rear-wheel speed $v_r$ or the front-wheel speed $v_f$ is an example of the information regarding the moving speed, the rear-wheel speed sensor 7 or the front-wheel speed sensor 6 is an example of the speed information detector, and the ECU 20 is an example of the estimator.

Further, the vehicle 100 or the vehicle body 1 is an example of the movable object, the front wheel 2 is an example of the front wheel, the rear wheel 3 is an example of the rear wheel, the rear-wheel speed sensor 7 is an example of the rear-wheel rotational speed estimator, the front-wheel speed sensor 6 is an example of the front-wheel rotational speed detector, and the ECU 20 is an example of the rear-wheel rotational speed estimator.

Further, the low pass filters 63, 64, 65 are examples of the first, second, and third low pass filters, and the Kalman filter 80 implemented by the ECU 20 and the program is an example of the Kalman filter. The navigation system 12 or the headlight driving device 15 is an example of the processor.

As the elements recited in the claims, a variety of other elements having the configuration or function recited in the claims may be used as well.

Various preferred embodiments of the present invention are applicable to estimation of the roll angle of transport equipment, etc.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A roll angle estimation device that estimates a roll angle of a movable object, the roll angle estimation device comprising:
   a roll angular velocity detector that detects a roll angular velocity;
   a yaw angular velocity detector that detects a yaw angular velocity;
   first, second, and third acceleration detectors that detect first, second, and third accelerations, respectively, in at least three directions different from one another;
   a speed information detector that detects information regarding a moving speed in a traveling direction of the movable object; and
   an estimator that estimates the roll angle of the movable object and also estimates at least an offset error of the roll angular velocity detector and an offset error of the yaw angular velocity detector; wherein
   the estimator estimates the roll angle of the movable object, the offset error of the roll angular velocity detector, and the offset error of the yaw angular velocity detector in a current estimation operation on the basis of a detected value of the roll angular velocity detector, a detected value of the yaw angular velocity detector, detected values of the first, second, and third acceleration detectors, a detected value of the speed information detector, an estimated value of the roll angle obtained in a previous estimation operation, an estimated value of the offset error of the roll angular velocity detector obtained in the previous estimation operation, and an estimated value of the offset error of the yaw angular velocity detector obtained in the previous estimation operation.

2. The roll angle estimation device according to claim 1, wherein the estimator further estimates an offset error of at least one of the first, second, and third acceleration detectors in the current and previous estimation operations; and
   the estimator estimates the roll angle of the movable object, the offset error of the roll angular velocity detector, the offset error of the yaw angular velocity detector, and the offset error of the at least one of the first, second, and third acceleration detectors in the current estimation operation on the basis of the detected value of the roll angular velocity detector, the detected value of the yaw angular velocity detector, the detected values of the first, second, and third acceleration detectors, the detected value of the speed information detector, the estimated value of the offset error of the roll angular velocity detector obtained in the previous estimation operation, the estimated value of the offset error of the yaw angular velocity detector obtained in the previous estimation operation, and the offset error of the at least one of the first, second, and third acceleration detectors obtained in the previous estimation operation.

3. The roll angle estimation device according to claim 2, wherein the first acceleration is an acceleration in an up-and-down direction of the movable object, and the estimator estimates the offset error of the first acceleration detector as the offset error of the at least one of the first, second, and third acceleration detectors.

4. The roll angle estimation device according to claim 1, wherein
   the movable object includes a front wheel and a rear wheel;

the speed information detector includes a rear-wheel rotational speed detector that detects a rotational speed of the rear wheel as the information; and the estimator estimates a moving speed of the movable object, and estimates the roll angle of the movable object, the offset error of the roll angular velocity detector, the offset error of the yaw angular velocity detector, and the moving speed of the movable object in the current estimation operation on the basis of the detected value of the roll angular velocity detector, the detected value of the yaw angular velocity detector, the detected values of the first, second, and third acceleration detectors, a detected value of the rear-wheel speed detector, the estimated value of the roll angle obtained in the previous estimation operation, the estimated value of the offset error of the roll angular velocity detector obtained in the previous estimation operation, the estimated value of the offset error of the yaw angular velocity detector obtained in the previous estimation operation, and an estimated value of the moving speed obtained in the previous estimation operation.

5. The roll angle estimation device according to claim 1, wherein the movable object includes a front wheel and a rear wheel;

the speed information detector includes:

a front-wheel rotational speed detector that detects a rotational speed of the front wheel; and a rear-wheel rotational speed estimator that estimates, as the information, a rotational speed of the rear wheel from a detected value of the front-wheel rotational speed detector; and the estimator estimates a moving speed of the movable object, and estimates the roll angle of the movable object, the offset error of the roll angular velocity detector, the offset error of the yaw angular velocity detector, and the moving speed of the movable object in the current estimation operation on the basis of the detected value of the roll angular velocity detector, the detected value of the yaw angular velocity detector, the detected values of the first, second, and third acceleration detectors, an estimated value of the rear-wheel rotational speed estimator, the estimated value of the roll angle obtained in the previous estimation operation, the estimated value of the offset error of the roll angular velocity detector obtained in the previous estimation operation, the estimated value of the offset error of the yaw angular velocity detector obtained in the previous estimation operation, and an estimated value of the moving speed obtained in the previous estimation operation.

6. The roll angle estimation device according to claim 1, wherein the estimator includes a Kalman filter that estimates the roll angle of the movable object, the offset error of the roll angular velocity detector, and the offset error of the yaw angular velocity detector in the current estimation operation by using a relationship among the detected value of the roll angular velocity detector, the detected value of the yaw angular velocity detector, the detected values of the first, second, and third acceleration detectors, the detected value of the speed information detector, the estimated value of the roll angle obtained in the previous estimation operation, the estimated value of the offset error of the roll angular velocity detector obtained in the previous estimation operation, and the estimated value of the offset error of the yaw angular velocity detector obtained in the previous estimation operation.

7. A transport equipment comprising:

a movable object configured to be movable;

the roll angle estimation device as recited in claim 1 that estimates a roll angle of the movable object; and a processor that performs processing using the roll angle estimated by the roll angle estimation device.

8. A roll angle estimation device that estimates a roll angle of a movable object, the roll angle estimation device comprising:

a roll angular velocity detector that detects a roll angular velocity;

a yaw angular velocity detector that detects a yaw angular velocity;

first, second, and third acceleration detectors that detect first, second, and third accelerations, respectively, in at least three directions different from one another;

a speed information detector that detects information regarding a moving speed in a traveling direction of the movable object; and an estimator that estimates the roll angle of the movable object and also estimates at least an offset error of the roll angular velocity detector and an offset error of the yaw angular velocity detector; wherein the estimator estimates an output parameter group including the roll angle of the movable object, the offset error of the roll angular velocity detector, and the offset error of the yaw angular velocity detector in a current estimation operation on the basis of:

a first input parameter group including a detected value of the roll angular velocity detector, a detected value of the yaw angular velocity detector, detected values of the first, second, and third acceleration detectors, and a detected value of the speed information detector; and a second input parameter group including an estimated value of the roll angle obtained in a previous estimation operation, an estimated value of the offset error of the roll angular velocity detector obtained in the previous estimation operation, and an estimated value of the offset error of the yaw angular velocity detector obtained in the previous estimation operation.

9. A roll angle estimation device that estimates a roll angle of a movable object, the roll angle estimation device comprising:

a roll angular velocity detector that detects a roll angular velocity;

a yaw angular velocity detector that detects a yaw angular velocity;

first, second, and third acceleration detectors that detect first, second, and third accelerations, respectively, in at least three directions different from one another;

a speed information detector that detects information regarding a moving speed in a traveling direction of the movable object; and an estimator that estimates the roll angle of the movable object and also estimates at least an offset error of the roll angular velocity detector and an offset error of the yaw angular velocity detector; wherein in a current estimation operation, the estimator:

estimates the roll angle of the movable object on the basis of a parameter group including a detected value of the roll angular velocity detector, a detected value of the yaw angular velocity detector, detected values of the first, second, and third acceleration detectors, a detected value of the speed information detector, an estimated value of the roll angle obtained in a previous estimation operation, an estimated value of the offset error of the roll angular velocity detector obtained in the previous estimation operation, and an estimated value of the offset error of the yaw angular velocity detector obtained in the previous estimation operation;

estimates the offset error of the roll angular velocity detector on the basis of the parameter group; and estimates the offset error of the yaw angular velocity detector on the basis of the parameter group.

* * * * *